(12) United States Patent
Zheng (10) Patent No.: US 8,553,431 B2
(45) Date of Patent: Oct. 8, 2013

(54) SWITCHING POWER CONVERTER WITH LOAD IMPEDANCE DETECTION

(75) Inventor: Junjie Zheng, Santa Clara, CA (US)

(73) Assignee: iWatt Inc., Campbell, CA (US)

( * ) Notice: Subject to any disclaimer, the term of this patent is extended or adjusted under 35 U.S.C. 154(b) by 515 days.

(21) Appl. No.: 12/697,826

(22) Filed: Feb. 1, 2010

(65) Prior Publication Data

US 2010/0195355 A1 Aug. 5, 2010

Related U.S. Application Data

(60) Provisional application No. 61/149,579, filed on Feb. 3, 2009.

(51) Int. Cl.
*H02M 3/335* (2006.01)

(52) U.S. Cl.
USPC ........................................... 363/21.12

(58) Field of Classification Search
USPC .................................. 363/21.12, 21.13, 21.16
See application file for complete search history.

(56) References Cited

U.S. PATENT DOCUMENTS

| | | | | |
|---|---|---|---|---|
| 6,104,622 A * | 8/2000 | Shin | | 363/21.07 |
| 6,842,350 B2 * | 1/2005 | Yamada et al. | | 363/21.16 |
| 6,850,401 B2 * | 2/2005 | Inoue et al. | | 361/111 |
| 7,035,119 B2 * | 4/2006 | Koike | | 363/19 |
| 7,106,602 B2 * | 9/2006 | Mabanta et al. | | 363/18 |
| 7,894,216 B2 * | 2/2011 | Melanson | | 363/21.13 |
| 2006/0098462 A1 * | 5/2006 | Usui | | 363/21.01 |
| 2007/0253228 A1 * | 11/2007 | Morota et al. | | 363/21.12 |
| 2008/0007977 A1 * | 1/2008 | Piper et al. | | 363/21.16 |

* cited by examiner

*Primary Examiner* — Harry Behm
(74) *Attorney, Agent, or Firm* — Fenwick & West LLP (57) ABSTRACT

In a switching power converter, no-load condition is detected based on a variety of parameters including the output current, primary current, transformer reset time, and switching period. Once the no-load condition is detected, the switching power converter enters stand-by mode, in which the reference voltage corresponding to the target regulated output voltage of the switching power converter is lowered to a low stand-by value or the switching power converter is shut down for a predetermined duration. As a result, power loss during the stand-by mode of the switching power converter can be reduced significantly.

18 Claims, 9 Drawing Sheets

SWITCHING POWER CONVERTER WITH LOAD IMPEDANCE DETECTION

CROSS-REFERENCE TO RELATED APPLICATION

This application claims priority under 35 U.S.C. §119(e) from U.S. Provisional Patent Application No. 61/149,579, entitled "Switching Power Converter with Load Impedance Detection," filed on Feb. 3, 2009, which is incorporated by reference herein in its entirety.

BACKGROUND OF THE INVENTION

1. Field of the Invention

The present invention relates to detecting no load conditions in a switching power converter and reducing the target regulated output voltage of the switching power converter or shutting down the switching power converter under the detected no-load conditions.

2. Description of the Related Arts

Switching power converters are often used in battery chargers for electronic devices such as cellular telephones and laptop computers to convert AC input voltage to a regulated DC voltage for use in charging the batteries. Regulation of the output voltage of switching power converters is generally accomplished by sensing the difference between an output voltage feedback signal approximating the output voltage and a reference, and using such difference (or error voltage) to determine how to control the on and off states of the power switch in the switching power converter so as to minimize the difference between the output voltage feedback signal and the reference. There are many well-known modulation techniques that can be used to control the ON and OFF cycles of the power switch of the switching power converter in order to maintain output regulation, including pulse-width-modulation (PWM) and pulse-frequency-modulation (PFM). The output voltage feedback signal can be obtained by directly sensing the output voltage of the switching power converter, or by indirectly sensing a signal that represents the regulated output voltage level. Indirect sensing can be especially useful in isolated power converters such as a flyback type switching power converter, where the controller is typically located on the primary side of a transformer in the switching power supply and the feedback signal can be provided by sensing a signal on the primary side of the transformer.

In general, battery chargers maintain the regulated output voltage regardless of whether the electronic device is connected to the battery charger. That is, battery chargers would provide the constant regulated output voltage even while the electronic device is not connected to the battery charger, so that the battery charger may be ready for the electronic device to be connected to the battery charger for charging. Although there is no energy delivered to the load during these periods of no-load conditions where the electronic device is not connected to the battery charger, there is still energy, often referred to as standby power, that is consumed by the switching power converter in order to maintain the regulated output voltage. Because of the large number of battery chargers that are used to charge the countless number of portable electronic devices, standby power loss may add up to a large amount of waste of energy.

SUMMARY OF THE INVENTION

Embodiments of the present invention include a switching power converter in which no-load condition is detected based on a variety of parameters including the output current, primary current, transformer reset time, and switching period. Once no-load condition is detected, the switching power converter enters stand-by mode. In one embodiment of the stand-by mode, the switching power converter lowers the reference voltage (corresponding to the target regulated output voltage) of the switching power converter to a low stand-by value. As a result, the regulated output voltage of the switching power converter is reduced accordingly, and power loss during the stand-by mode of the switching power converter can be reduced significantly. In another embodiment of the stand-by mode, when the no-load condition is detected, the switching power converter is shut down for a predetermined sleep time.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, no-load condition is detected in a switching power converter based on a variety of parameters including the output current, primary current, transformer reset time, and switching period. Once the no-load condition is detected, the switching power converter enters stand-by mode. In one example of the stand-by mode, switching power converter lowers the reference voltage (corresponding to the target regulated output voltage) of the switching power converter to a low stand-by value. As a result, the regulated output voltage of the switching power converter under no load conditions is reduced accordingly, and power loss during the stand-by mode of the switching power converter can be reduced significantly. In another example of the stand-by mode, when the no-load condition is detected, the switching power converter is shut down for a predetermined sleep time. Although reducing the reference voltage and shutting down the switching power converter are provided herein as examples of the "stand-by mode" of the switching power converter, the switching power converter can operate in a variety of different manners to implement the "stand-by mode" in order reduce or eliminate output power loss under no-load conditions.

Figure 1:
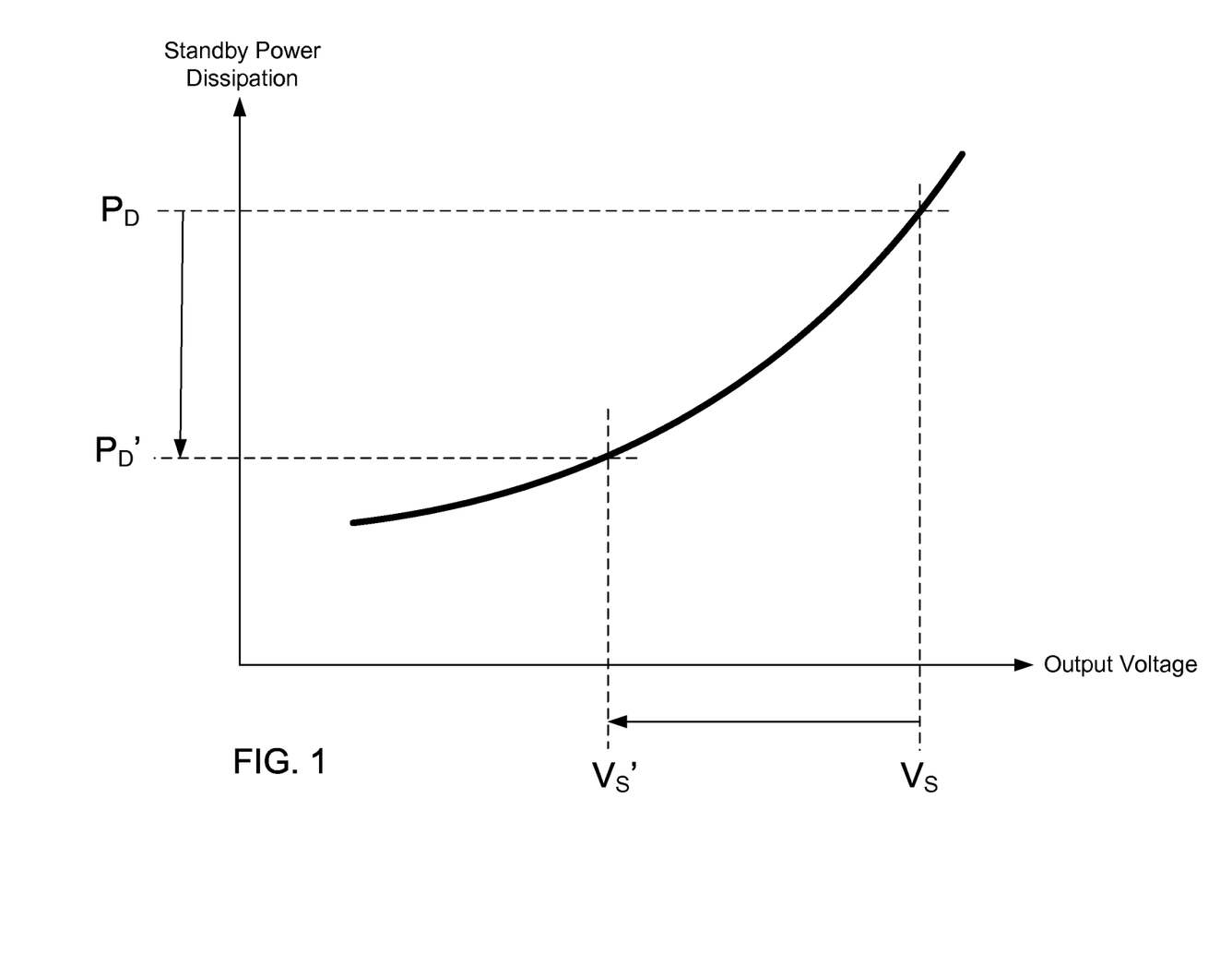
FIG. 1 illustrates the relationship between the output voltage of a switching power converter and standby power dissipation.

Turning to the figures, FIG. 1 illustrates the relationship between the output voltage of a switching power converter and standby power dissipation. The power dissipation of a switching power supply increases as the output voltage level increases. As illustrated in FIG. 1, the output voltage $V_S$ results in a standby power dissipation of $P_D$, and the output voltage setting $V_S'$ results in a standby power dissipation of $P_D'$. Standby power reduction is represented by $P_D$ minus $P_D'$. Thus, in the switching power converter of the present invention, the regulated output voltage is lowered when no-load condition is detected (e.g., no electronic device is connected to the battery charger) in the switching power converter to reduce standby power loss.

Figure 2A:
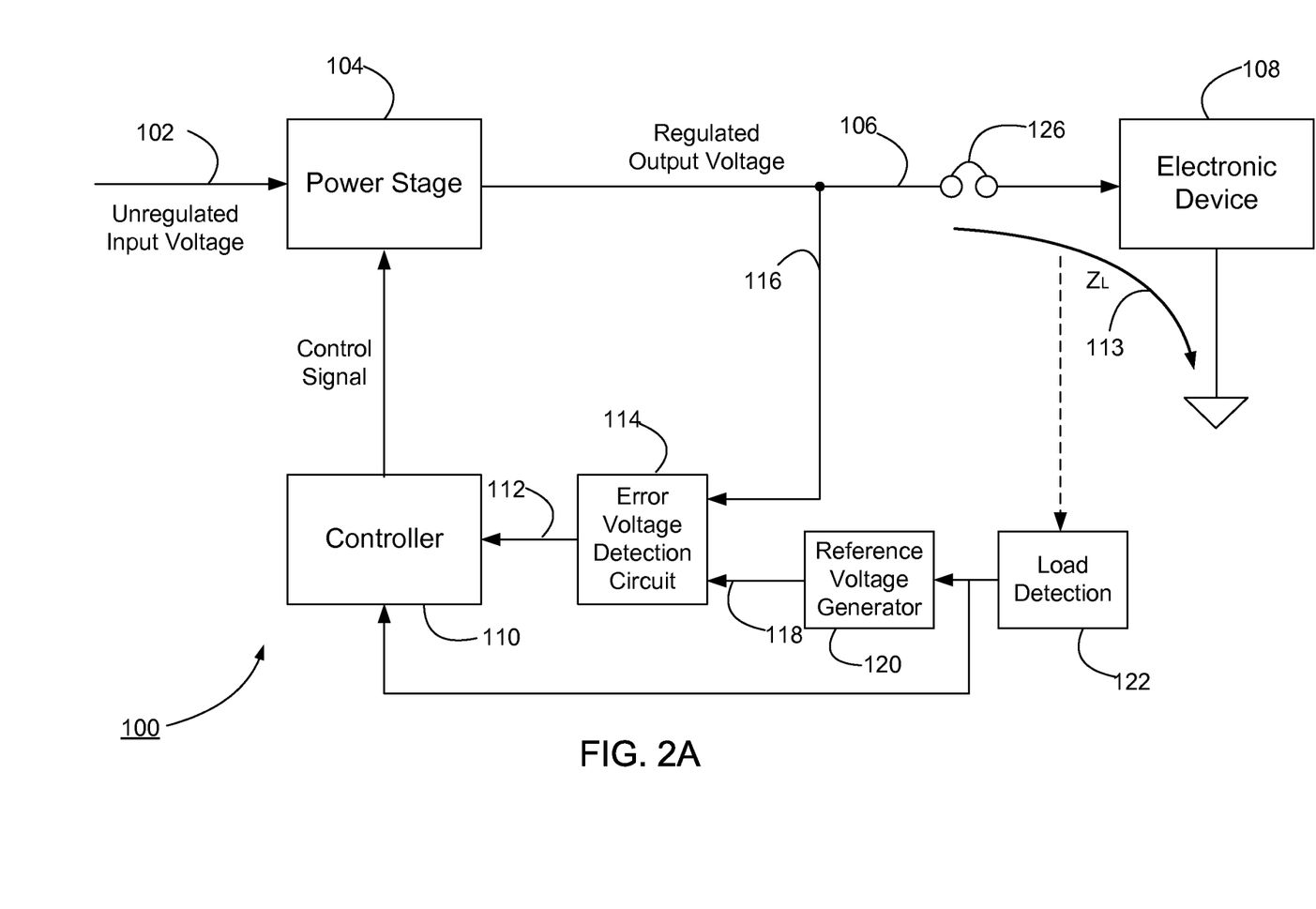
FIG. 2A illustrates a flyback type AC-DC switching power converter, according to one embodiment of the present invention.

FIG. 2A illustrates a flyback type AC-DC switching power converter, according to one embodiment of the present invention. Consider, for example, the switching power supply 100, which is used to charge the battery (not shown) of electronic device 108. Electronic device 108 is sometimes connected to the switching power supply 100 and sometimes disconnected from switching power supply 100 via connector 126. The switching power supply 100 is connected to unregulated AC input voltage 102, and provides a regulated output voltage 106. The switching power converter 100 includes a power stage 104, a controller 110, an error voltage detection circuit 114, a reference voltage generator 120, and a load detection circuit 122.

Feedback signal 116 represents the regulated output voltage 106 provided to electronic device 106. Error voltage detection circuit 114 compares the feedback signal 116 to reference voltage 118 generated by reference voltage generator 120. Error voltage detection circuit 114 determines the difference between the regulated output voltage 106 and the reference voltage 118, which is represented by error voltage signal 112. Based on the error voltage signal 112, controller 110 determines how to control the power stage 104 in order to provide the necessary output regulation using, for example, pulse width modulation (PWM) or pulse frequency modulation (PFM).

Load detection circuit 122 determines whether electronic device 108 is connected to switching power supply 100. If the electronic device 108 is connected, reference voltage generator 120 sets the reference voltage 118 to provide the proper operating voltage for the charging and operation of the portable electronic device 108.

In one embodiment, if load detection circuit 122 determines that electronic device 108 is not connected to switching power supply 100, reference voltage generator 120 lowers the reference voltage 118 in a stand-by mode, so that a lower, standby regulated output voltage 106 is generated by switching power converter 100.

Load detection circuit 122 can determine the connection of electronic device 108 or, more generally the load impedance $Z_L$ 113 of the regulated output loop. A low impedance would indicate that electronic device 108 is connected to switching power supply 100, while a high impedance would indicate that electronic device 108 is not connected to switching power supply 100, or that the battery of electronic device 108 is fully charged.

Figure 2B:
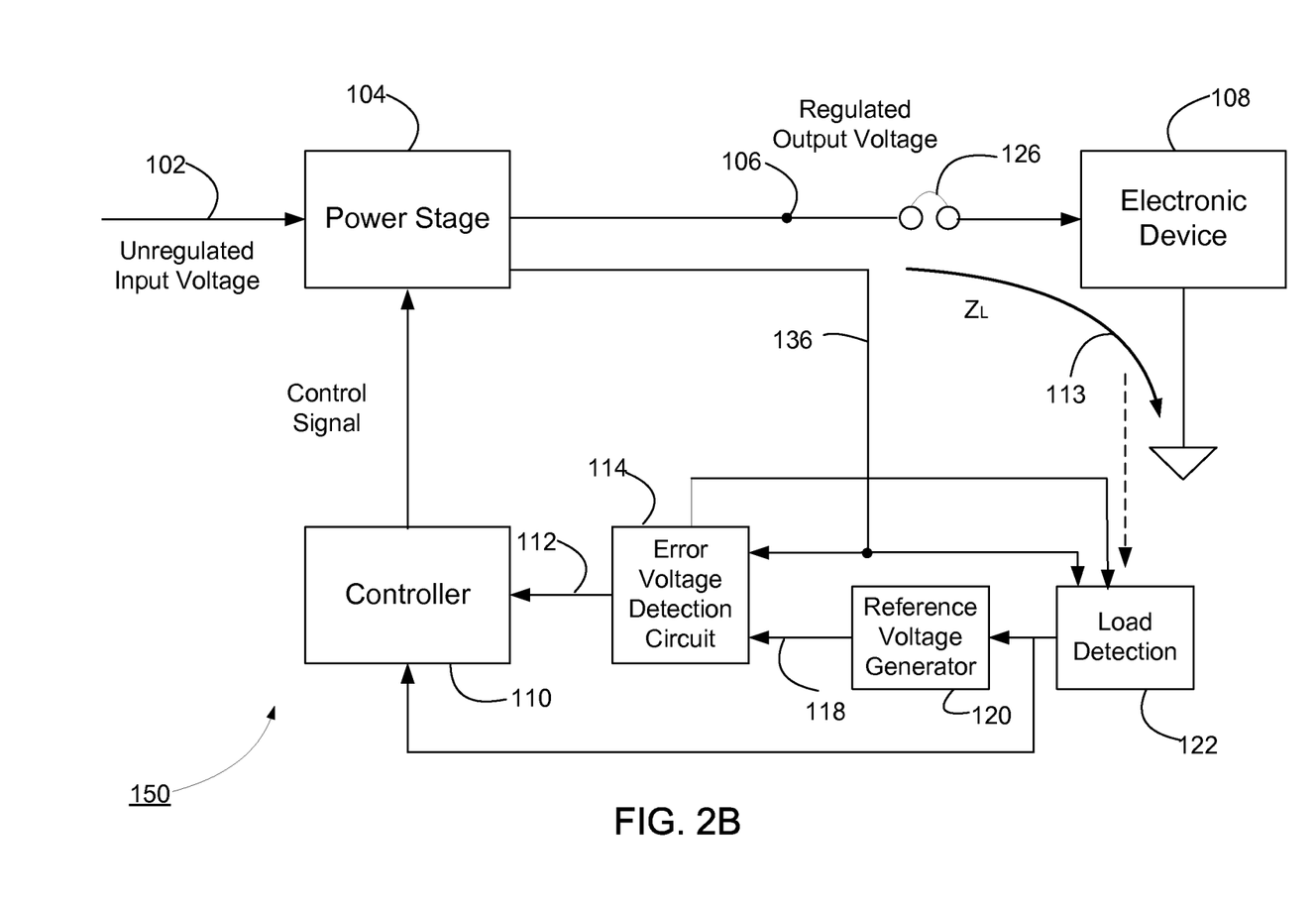
FIG. 2B illustrates a flyback type AC-DC switching power converter, according to another embodiment of the present invention.

FIG. 2B illustrates a flyback type AC-DC switching power converter 150, according to another embodiment of the present invention. The switching power supply 150 of FIG. 2B is substantially same as the switching power supply 100 of FIG. 2A, but also illustrates that load detection circuit 122 detects the state of load impedance $Z_L$ 113 via sensing various timing parameters and switching waveforms of power stage 104 via signal 136, which may also be input to the error voltage detection circuit 114. By detecting the state of load impedance $Z_L$ 113, load detection circuit 122 determines whether electronic device 108 is connected to switching power supply 100. Furthermore, if electronic device 108 is connected, the state of the output load can be determined.

Figure 2C:
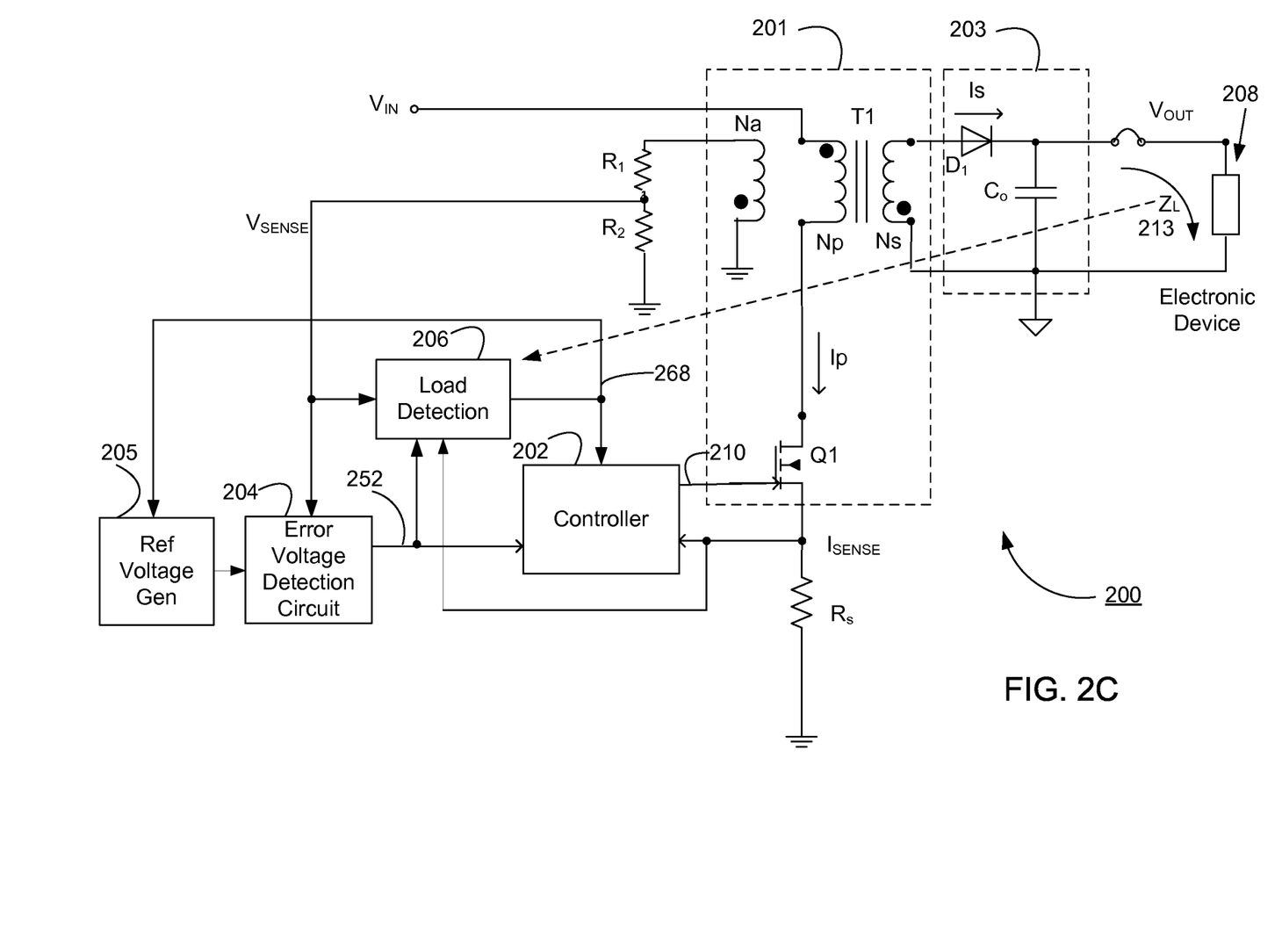
FIG. 2C illustrates an example of circuitry of the flyback type AC-DC switching power converter of FIG. 2B, according to said another embodiment of the present invention.

FIG. 2C illustrates an example of circuitry of the flyback type AC-DC switching power converter of FIG. 2B, according to said another embodiment of the present invention. The power converter 200 includes a power stage 201 and a secondary output stage 203. Power stage 201 includes a power MOSFET switch Q1 and a power transformer T1 including primary winding Np, secondary winding Ns, and auxiliary winding Na. Secondary output stage 203 includes diode $D_1$ and output capacitor $C_o$. Controller 202 generates the output drive signal 210 that drives switch Q1. The AC power is received from an AC power source (not shown) and is rectified to provide the unregulated input voltage $V_{IN}$. The input power is stored in transformer T1 while the switch Q1 is turned on, because the diode $D_1$ becomes reverse biased when the switch Q1 is turned on. The rectified input power is then transferred to electronic device 208 across the capacitor $C_o$ while the switch Q1 is turned off, because the diode $D_1$ becomes forward biased when the switch Q1 is turned off. Diode $D_1$ functions as an output rectifier and capacitor $C_o$ functions as an output filter.

The resulting regulated output voltage $V_{OUT}$ is delivered to electronic device 208. When the electronic device 208 is not connected to the switching power converter 200 (e.g., in stand-by mode) or the electronic device 208 is fully charged, the load impedance $Z_L$ 213 is very high. In other words, the load impedance $Z_L$ 213 represents the operation and connection status of the electronic device 208.

Controller 202 can employ any one of a number of well-known modulation techniques, such as pulse-width-modulation (PWM) or pulse-frequency-modulation (PFM), to control the ON and OFF states and duty cycles of power switch Q1. Thus, controller 202 generates appropriate switch drive pulses 210 to control the on-times and off-times of power switch Q1 and regulate the output voltage $V_{OUT}$, using a feedback loop based on the sensed output voltage $V_{SENSE}$ and the sensed primary side current Ip in previous switching cycles of the switching power converter, in a variety of operation modes including PWM and PFM modes.

$I_{SENSE}$ is used to sense the primary current Ip through the primary winding Np and switch Q1 in the form of a voltage across sense resistor $R_S$. The voltage $I_{SENSE}$ is compared in controller 202 with a voltage Vipk corresponding to a peak primary current to implement peak current mode switching to limit the primary current Ip when it reaches the peak current threshold value. The output voltage $V_{OUT}$ is reflected across auxiliary winding Na of transformer T1, which is input to error voltage detection circuit 204 and load detection circuit 206 as the voltage $V_{SENSE}$ via a resistive voltage divider comprised of resistors $R_1$ and $R_2$. Error voltage detection circuit 204 determines the feedback voltage $V_{fb}$ by sampling the voltage $V_{SENSE}$ at the end of the transformer reset time Trst in each switching cycle of the power converter 200 and scaling the sampled voltage to a comparable level for comparison with the scaled target regulated output voltage $V_{REF}$, as generated by the reference voltage generator 205. Error voltage detection circuit 204 determines the difference between the sampled voltage $V_{fb}$ and the reference voltage $V_{REF}$ and generates an error voltage signal 252 representing such difference. Once the error voltage 252 has been determined, it is input to controller 202.

As will be explained below, load detection signal 268 is a parameter indicating the extent of power supply loading, and whether the electronic device 208 is connected to power converter 200.

Figure 2D:
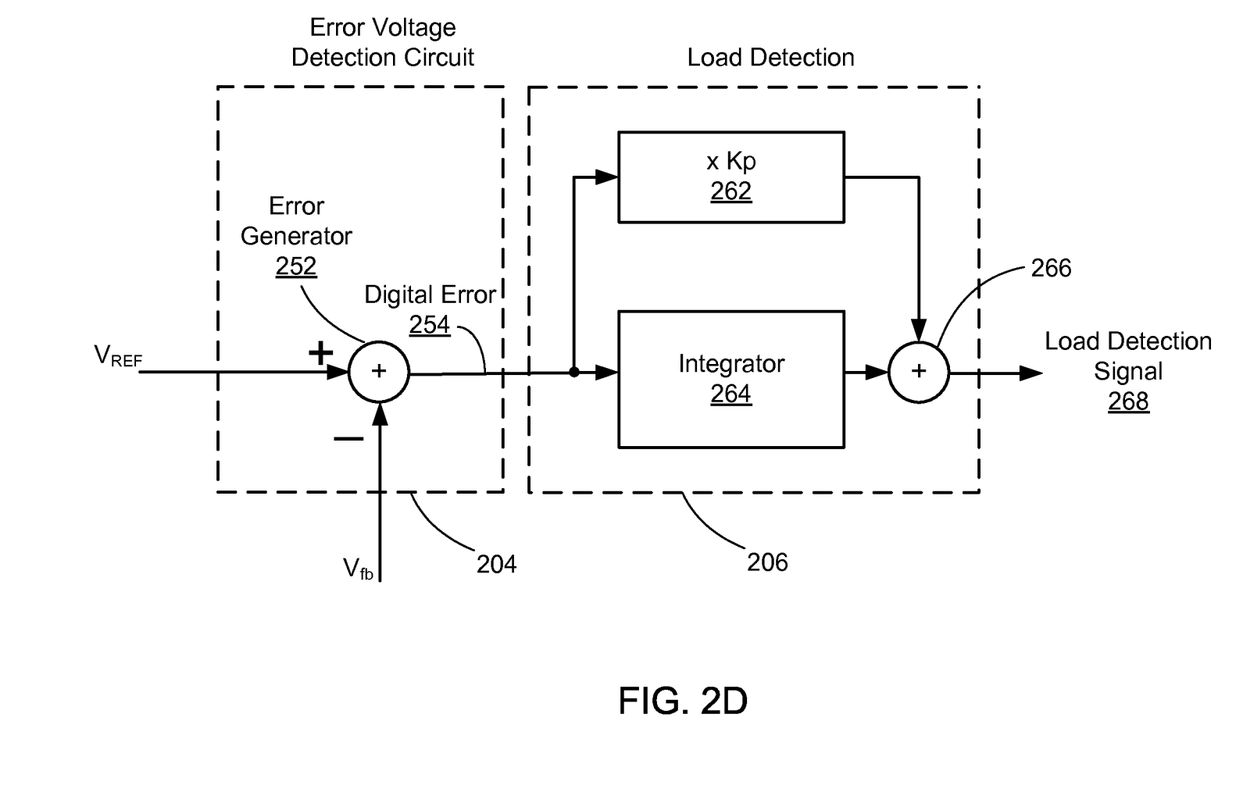
FIG. 2D illustrates an example of circuitry of the load detection circuit in FIG. 2C, according to one embodiment of the present invention.

FIG. 2D illustrates an example of circuitry of the load detection circuit 206 in FIG. 2C generating a load detection signal 268. Load detection circuit 206 is coupled to error voltage detection circuit 204. As described above, error voltage detection circuit 204 includes a digital error generator 252 that determines the difference between the feedback voltage $V_{fb}$ and the reference voltage $V_{REF}$. The resulting digital error signal 254 is input to a P-I function (proportional-integral function) comprised of an integrator 264 and a proportional block 262. Integrator 264 integrates digital error signal 254 over all previous switching cycles or a predetermined number of previous switching cycles, whose output is added to a scaled value (scaled by coefficient Kp in proportional block 262) of the digital error signal 254 in adder 266 to generate the load detection signal 266. Thus, the load detection signal indicates the extent of power supply loading (level of output current), i.e., how much energy has to be transferred to the load per switching cycle in order to maintain the required output voltage. In general, increasing the load detection signal 266 indicates that the output voltage $V_{OUT}$ is lower than desired and should be increased, and decreasing the load detection signal 266 indicates that the output voltage $V_{OUT}$ is higher than desired and should be decreased. Therefore, if error signal 254 indicates that the output voltage $V_{OUT}$ ($V_{fb}$) is lower than desired, then load detection signal 268 will be increased by the P-I function, which will in turn cause the on-time (Ton) of the switch Q1 to increase and thereby transfer more energy to the load $Z_L$ per switching cycle to maintain the required output regulation voltage. If error signal 254 indicates that the output voltage $V_{OUT}$ ($V_{fb}$) is higher than the reference voltage $V_{REF}$, the load detection signal 268 will be decreased by the P-I function, which will in turn cause the on-time (Ton) of the switch Q1 to decrease and thereby transfer less energy to the electronic device 208 per switching cycle to maintain the required output regulation voltage. Although FIG. 2D illustrates one example of a digital implementation of circuitry for generating the load detection signal 268, other digital or analog implementations can be used to generate a similar parameter reflecting the extent of power supply loading.

Figure 3:
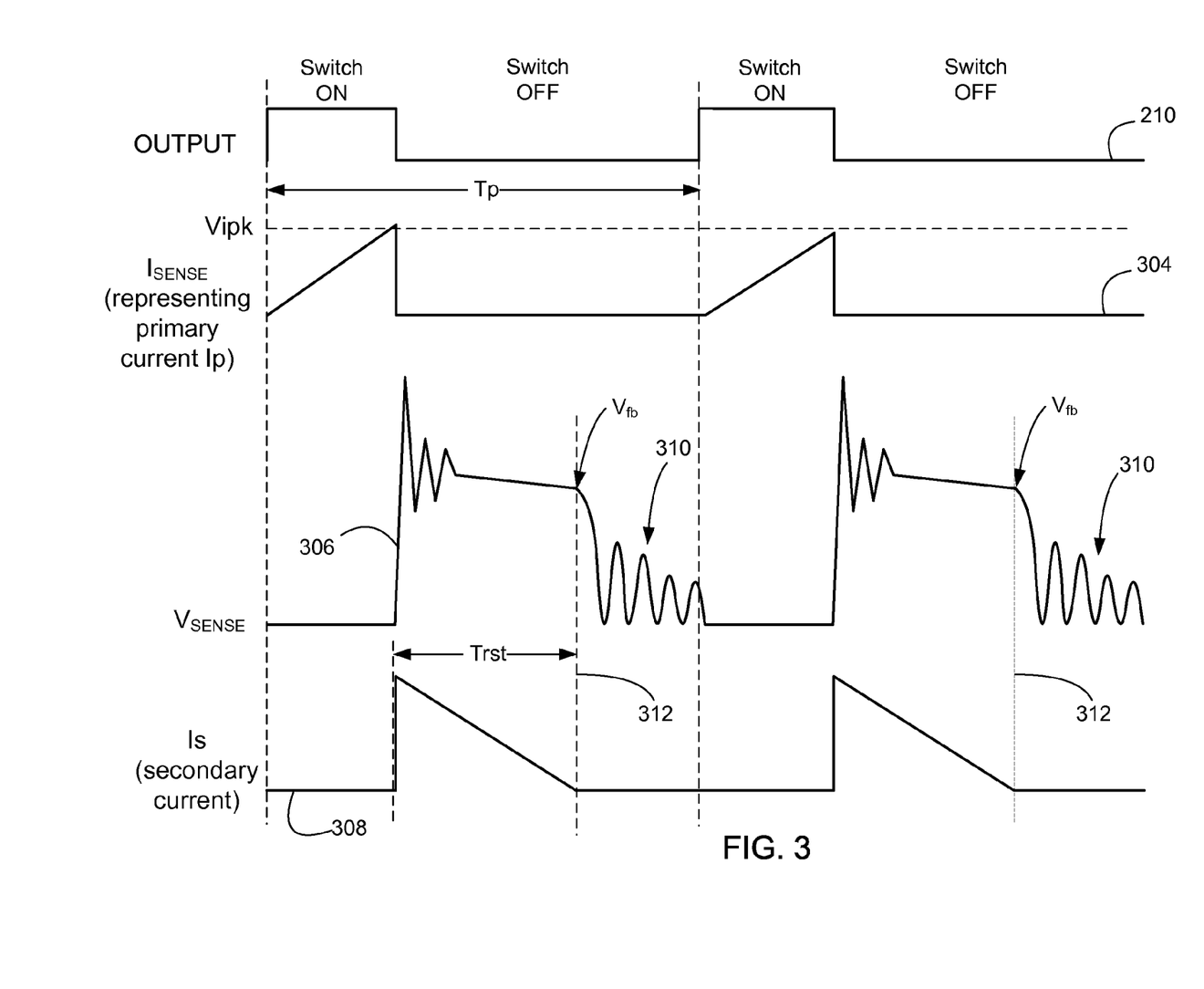
FIG. 3 illustrates the operational waveforms of the switching power converter of FIG. 2C, according to one embodiment of the present invention.

FIG. 3 illustrates the operational waveforms of the switching power converter of FIG. 2C, according to one embodiment of the present invention. Referring to FIG. 3 together with FIG. 2C, controller 202 outputs a control signal 210 (OUTPUT, in current form), which defines the ON and OFF states of power switch Q1. The primary current Ip through switch Q1 and primary winding Np is represented as the voltage, $I_{SENSE}$ 304. When control signal 210 is high and thus power switch Q1 is in the ON state, primary current Ip (represented by $I_{SENSE}$) 304 ramps up. The rate of ramp up of primary current Ip ($I_{SENSE}$) 304 is predominantly based on the input line voltage $V_{IN}$ and the magnetizing inductance Lm of primary winding Np. When power switch Q1 is in the ON state, output rectifier diode $D_1$ is reversed biased, and thus $V_{SENSE}$ voltage 306 (representing the output voltage $V_{OUT}$) is zero and the secondary current Is 308 is also equal to 0 A. Thus, while power switch Q1 is in the ON state, energy is stored in power transformer T1 but not delivered to the electronic device 208 at the output.

When primary current Ip (represented by $I_{SENSE}$ 304) reaches the peak current mode threshold Vipk, control signal 210 becomes low, and the power switch Q1 is switched to the OFF state. As a result, output rectifier diode $D_1$ becomes forward biased and energy stored in transformer T1 is delivered to the secondary winding Ns based on the turns ratio (Ns/Np) between the primary winding Np and the secondary winding Ns. As the energy stored in power transformer T1 is delivered to the secondary winding Ns, secondary current Is 308 spikes up and then starts to ramp down. Similarly, the $V_{SENSE}$ voltage 306 also spikes up and then slowly ramps down. When all of the energy stored in power transformer T1 is delivered to the secondary side Ns, secondary current Is 308 becomes equal to 0 A, which point is also referred to as the transformer reset point 312. The period Trst during which secondary current Is spikes up and then reaches zero is referred to as the transformer reset time Trst. Also, the complete period of the OUTPUT signal 210 is referred to as the switching period Tp. Note that the feedback voltage $V_{fb}$ (explained above with reference to FIG. 2C) is sampled from $V_{SENSE}$ at the transformer reset point 312. If power switch Q1 remains in the OFF state beyond the transformer reset point 312, the Vsense voltage exhibits high frequency ringing, generally occurring during voltage ringing period 310, with the ringing decaying. Then, controller 202 will determine the next turn-on time of power switch Q1 based on the selected operation mode (PWM or PFM) and generate a high control signal 210 to turn on the power switch Q1 for the next switching cycle, and the above described operation is repeated in the next and additional subsequent switching cycles.

Figure 4:
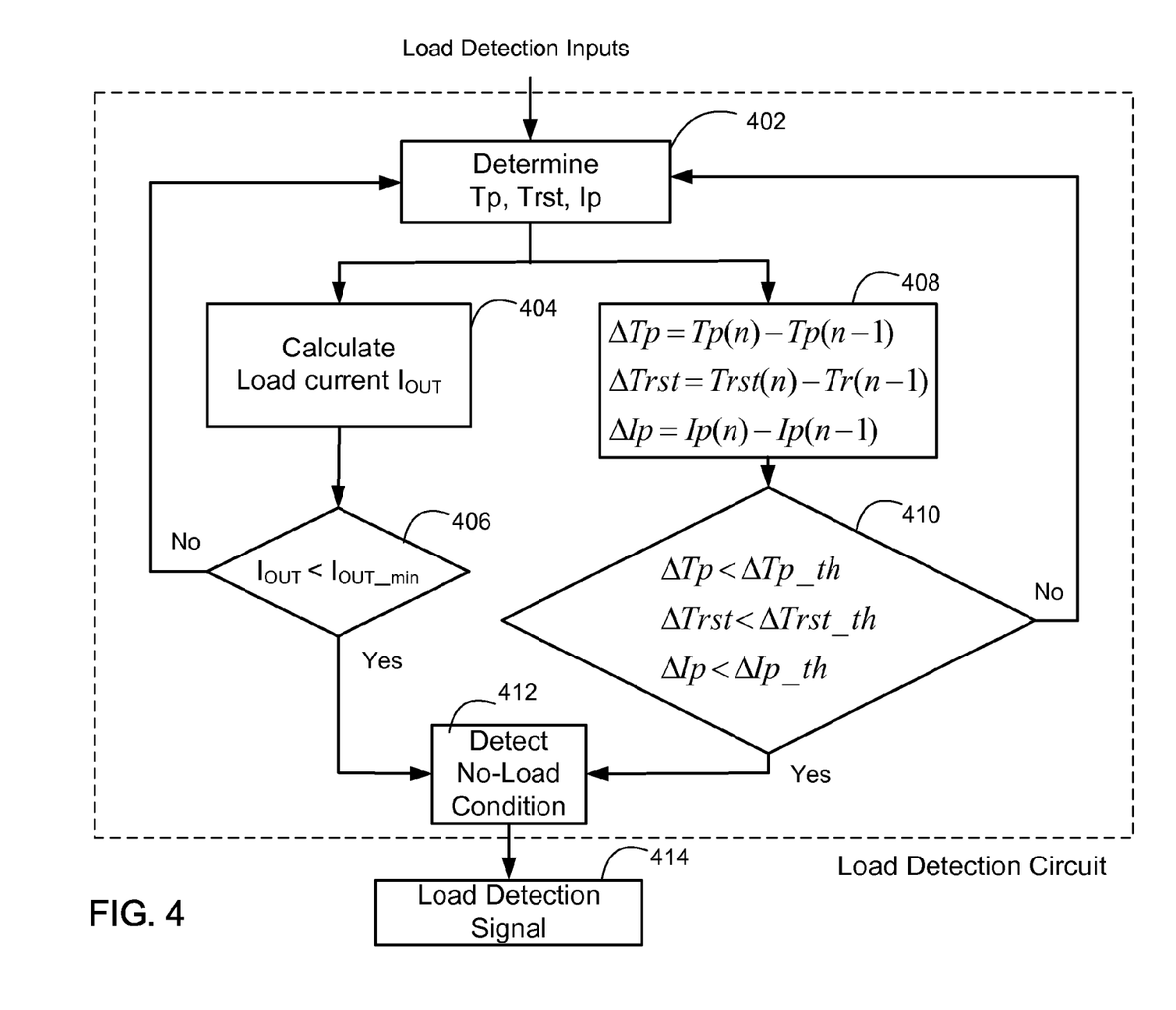
FIG. 4 is a flowchart illustrating a method of detecting a no-load condition in the switching power converter of FIG. 2C, according to another embodiment of the present invention.

FIG. 4 is a flowchart illustrating a method of detecting no-load condition in the switching power converter of FIG. 2C, according to another embodiment of the present invention. As explained above with reference to FIG. 3, during the period of on-time of switch Q1, the voltage $V_{IN}$ is applied across the magnetic inductance Lm of the primary winding Np and energy is stored therein. During the period of off-time of switch Q1, primary current Ip is transferred to the secondary current Is. The slew rate of the secondary current Is depends on the output voltage $V_{OUT}$ and the secondary reflected inductance Ls of transformer T1. More specifically, the following equations 1 and 2 hold:

Turn-on slew rate:

$$\frac{d(Ip)}{dt} = \frac{Vg}{Ln} \quad \text{(Equation 1)}$$

Turn-off slew rate:

$$\frac{d(Is)}{dt} = \frac{V_{OUT}}{Ls} \quad \text{(Equation 2)}$$

At steady-state, the output current $I_{OUT}$ is equal to the average of secondary current Is:

$$I_{OUT} = \frac{Trst}{2 \times Tp} \times Is, \quad \text{(Equation 3)}$$

where Trst is the transformer reset time and Tp is the switching period for a given switching cycle of the switching power converter 200. At steady state, the primary peak current Ip is equal to the secondary current Is, assuming the turns-ratio (Np/Ns) between the primary winding Np and secondary winding Ns is 1. Thus, by monitoring the transformer reset time Trst, the switching period Tp, and the peak value of the primary current Ip, it is possible to estimate the value of output current $I_{OUT}$ and the load impedance $Z_L$. High output current $I_{OUT}$ would indicate low load impedance $Z_L$ and low output current $I_{OUT}$ would indicate high load impedance $Z_L$.

Thus, in order to detect no-load condition in which an electronic device is not connected to the switching power converter 200, referring to FIG. 4 together with FIG. 2C, in step 402 load detection circuit 206 receives and determines $I_{SENSE}$ representing the primary current Ip, and the timing information including the switching period Tp and the transformer reset time Trst for each switching cycle of switching power converter 200 derived from $V_{SENSE}$. Then, in step 404 the load (output) current $I_{OUT}$ is calculated using equation 3 above. In parallel, the change in the switching period Tp, transformer reset time Trst, and the primary current Tp in the current switching cycle with respect to those values in the previous switching cycle are calculated in step 408 as follows:

$$\Delta Tp = Tp(n) - Tp(n-1) \quad \text{(Equation 4)}$$

$$\Delta Trst = Trst(n) - Tr(n-1) \quad \text{(Equation 5)}$$

$$\Delta Ip = Ip(n) - Ip(n-1) \quad \text{(Equation 6)}$$

If the estimated output current $I_{OUT}$ is smaller than the minimum output current threshold $I_{OUT\_min}$ in step 406, and if the changes in the values of Tp, Trst and Ip in the current switching cycle compared to those values in the previous switching cycle are less than their corresponding thresholds $\Delta Tp\_th$, $\Delta Trst\_th$, and $\Delta Ip\_th$, respectively, in step 410, it is determined that the output load impedance $Z_L$ is very low and no-load condition is detected 412. That is, no-load condition is detected in step 412 if all of the following conditions in steps 406 and 410 are true:

$$I_{OUT} < I_{OUT\_min} \quad \text{(Equation 7)}$$

$$\Delta Tp < \Delta Tp\_th \quad \text{(Equation 8)}$$

$$\Delta Trst < \Delta Trst\_th \quad \text{(Equation 9)}$$

$$\Delta Ip < \Delta Ip\_th \quad \text{(Equation 10)}$$

Under no-load condition, the load detection circuit 206 causes load detection signal 268 to indicate a no-load condition, in step 414. If it were determined that the electronic device 208 is not connected to the power converter 200, the reference voltage $V_{REF}$ corresponding to the target regulated output voltage may be reduced in stand-by mode, thereby reducing power dissipation under no-load conditions. If any of the conditions in steps 406 and 410 are not true, no-load condition is not present and the process returns to step 402 to repeat steps 402, 404, 406, 408, 410, and 412 in the next switching cycle.

Figure 5A:
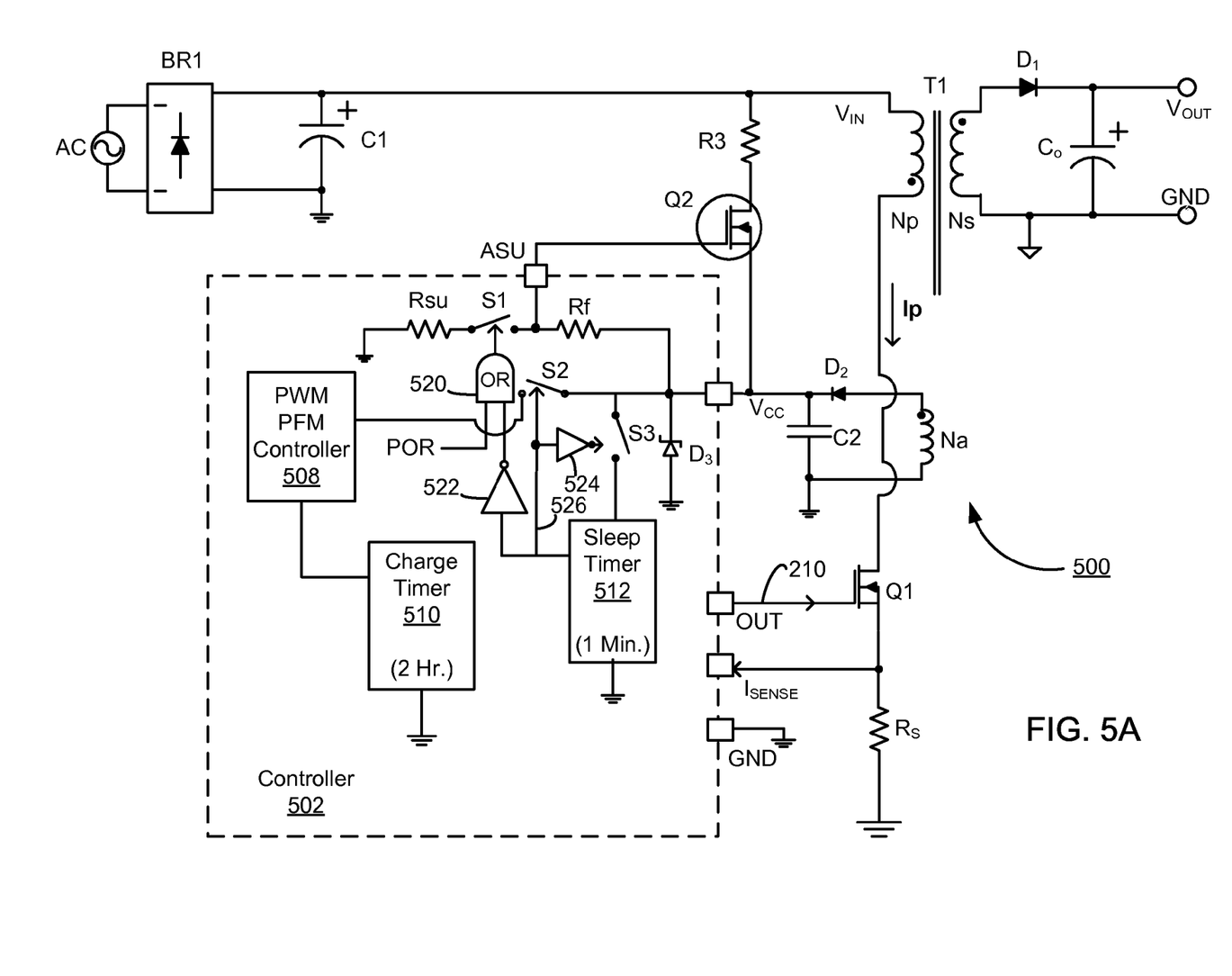
FIG. 5A illustrates an example of a flyback type AC-DC switching power converter, according to still another embodiment of the present invention.
Figure 5B:
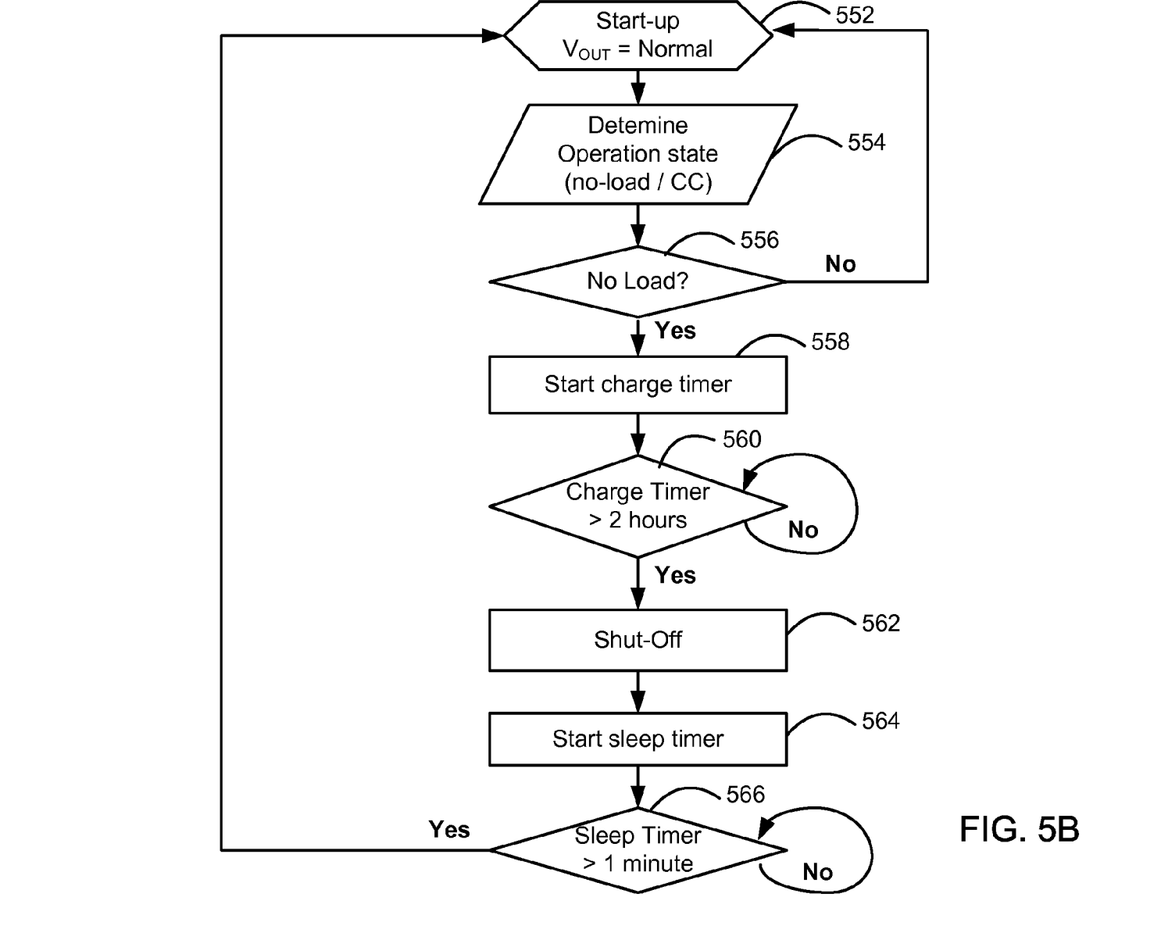
FIG. 5B is a flowchart illustrating a method of shutting down the flyback type AC-DC switching power converter of FIG. 5A under no-load conditions, according to still another embodiment of the present invention.

FIG. 5A illustrates an example of a flyback type AC-DC switching power converter, according to still another embodiment of the present invention, and FIG. 5B is a flowchart illustrating a method of shutting down the flyback type AC-DC switching power converter of FIG. 5A under no-load conditions, according to still another embodiment of the present invention. The embodiments in FIGS. 5A and 5B are configured to shut down the operation of the power converter for a predetermined period of time when a no-load condition is detected as the stand-by mode of the switching power converter.

The power converter 500 includes a transformer T1, diode $D_1$, a capacitor $C_o$, a power MOSFET switch Q1, switch Q2, resistors R3 and $R_s$, capacitor C2, and a controller 502. Controller 502 generates the output drive signal 210 that drives switch Q1. The AC power is received from an AC power source (AC) and is rectified by bridge rectifier BR1 to provide the unregulated input voltage $V_{IN}$. Capacitor C1 filters noise from the unregulated input voltage $V_{IN}$. The input power is stored in transformer Ti while the switch Q1 is turned on, because the diode $D_1$ becomes reverse biased when the switch Q1 is turned on. The rectified input power is then transferred to the load (not shown) across capacitor $C_o$ while the switch Q1 is turned off, because diode $D_1$ becomes forward biased when switch Q1 is turned off Diode $D_1$ functions as an output rectifier and capacitor $C_o$ functions as an output filter. The resulting regulated output voltage $V_{OUT}$ is delivered to the load (not shown).

Controller 502 includes a charge timer 510, sleep timer 512, a PWM/PFM control module 508 and other components shown in FIG. 5A such as resistors Rsu, Rf, switches S1, S2, S3, buffers 522, 524, and OR gate 520. In addition, other components as shown in FIG. 2C used for detecting no-load conditions in the power converter are also present in the controller 502 but not shown in FIG. 5A for simplicity of illustration. It is assumed herein that the controller 502 has the functionalities of detecting no-load conditions as described above with reference to FIG. 2C, 2D, or 4. Controller 502 can employ any one of a number of well-known modulation techniques, such as PWM or PFM, to control the ON and OFF states and duty cycles of power switch Q1. Thus, PWM/PFM control module 308 generates appropriate switch drive pulses 210 to control the on-times and off-times of power switch Q1 and regulate the output voltage $V_{OUT}$, using a feedback loop based on the sensed output voltage $V_{OUT}$ and the sensed primary side current Ip in previous switching cycles of the switching power converter, in a variety of operation modes including PWM and PFM modes. The voltage I SENSE is used to sense the primary current Ip through the primary winding Np and switch Q1 in the form of a voltage across sense resistor $R_S$. The output voltage $V_{OUT}$ is reflected across auxiliary winding Na of transformer T1, which is input to the controller 502 via the ASU pin of controller 502.

Referring to FIG. 5A, when PWM/PFM controller 508 detects a no-load condition, controller 502 is configured such that switch S1 is closed (on), switch S2 is opened (off), and switch S3 is closed (on). When switch S2 is open, PWM/PFM controller 508 is cut off from the $V_{IN}$ supply voltage, and thus controller 502 is shut off and switch Q1 is turned off. Thus, switching power converter 500 does not draw current from the AC mains, and the input power to the power converter 500 is reduced to zero. Also, when switch S1 is closed, switch Q2 is turned off. Also, when switch S3 is closed, sleep timer 512 starts to count. Sleep counter 512 is supplied power from capacitor C2.

When sleep timer 512 reaches a predetermined threshold sleep time (e.g., 1 minute), sleep timer 512 generates a signal 526 to close switch S2, open switch S1 (via buffer 522 and OR gate 520) and open switch S3 (via buffer 524). As a result, switch Q2 will turn on, and capacitor C2 is charged rapidly through switch Q2. Also, PWM/PFM controller 508 is turned on when the voltage across capacitor C2 reaches the threshold of POR (power-on-reset) voltage, and thus returning to normal operation. Thus, the output voltage $V_{OUT}$ is returned to the normal regulated output voltage when sleep timer 512 reaches the predetermined threshold sleep time. Diode $D_3$ is a Zener diode for clamping the Vcc voltage.

Switch Q2 is a depletion FET (Field Effect Transistor), which turns on when the gate and source are tied together and turns off when its gate voltage (at the ASU pin) is less than its source voltage (at the $V_{CC}$ pin). At the initial state of switch Q2 turned off, the gate of switch Q2 is tied with its source, and thus switch Q2 conducts. Capacitor C2 is charged up through switch Q2. When the voltage at the Vcc pin across capacitor C2 reaches the POR threshold, switch Si turned off (with POR signal applied to switch Si via the OR gate 520), and thus the gate voltage of switch Q2 becomes lower than the source voltage of switch Q2, turning off switch Q2.

Turning to FIG. 5B together with FIG. 5A, the operation of the power converter 500 of FIG. 5A is explained. At start-up condition in step 552, the output voltage $V_{OUT}$ is at its normal value (regulated target output voltage). In step 554, PWM/PFM controller 508 determines the operation state (no-load condition /constant current status) of switching power converter 500, using, for example the method explained above with reference to FIGS. 2C and 2D or FIG. 4. Steps 552, 554, 556 are repeated until a no-load condition is detected by controller 502. When controller 502 starts to operate under no-load condition (constant current status) in step 556, the charge timer 510 starts to count in step 558 until it reaches a predetermined threshold charge time (e.g., 2 hours) in step 560. When charge timer 510 reaches the predetermined threshold charge time (e.g., 2 hours), controller 502 is configured in step 562 such that switch S2 is open, switch S1 is closed and switch S3 is closed and thereby shutting off the controller 502 and the switching power converter 500. Also, in step 564, sleep timer 512 starts to count until a predetermined threshold sleep time (e.g., 1 minute) is reached. Once sleep timer 512 reaches the predetermined threshold sleep time in step 566, the operation of controller 502 returns to step 552 to operate the switching power converter 500 in normal operation.

Upon reading this disclosure, those of skill in the art will appreciate still additional alternative designs for detecting no-load conditions in a switching power converter and operating the switching power converter under no-load conditions. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A switching power converter, comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a controller configured to generate a control signal to turn on or turn off the switch, the switch being turned on responsive to the control signal being in a first state and the switch being turned off responsive to the control signal being in a second state; and
a load detection circuit configured to determine an output load of the switching power converter by determining the output current as an average of secondary current in the secondary winding of the transformer and determining whether the output current of the switching power converter is less than a predetermined output current, the controller causing the switching power converter to enter a stand-by mode responsive to the load detection circuit determining a no-load condition in which the output load is less than a predetermined output load, and wherein the controller lowers a reference voltage corresponding to a target output voltage of the switching power converter in the stand-by mode responsive to the load detection circuit determining the no-load condition.

2. The switching power converter of claim 1, wherein the controller is further configured to shut down the operation of the switching power converter for a predetermined period of time in the stand-by mode.

3. The switching power converter of claim 1, wherein the load detection circuit determines the output load by integrating a difference between a sampled voltage indicative of an actual output voltage and a target output voltage of the switching power converter over a predetermined duration to determine an impedance of the output load.

4. The switching power converter of claim 1, wherein the load detection circuit determines whether an electronic device is connected to the output of the switching power converter.

5. The switching power converter of claim 4, wherein the load detection circuit determines whether a battery of the electronic device is fully charged.

6. A switching power converter, comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a controller configured to generate a control signal to turn on or turn off the switch, the switch being turned on responsive to the control signal being in a first state and the switch being turned off responsive to the control signal being in a second state; and
a load detection circuit configured to determine an output load of the switching power converter and to determine whether an output current of the switching power converter is less than a predetermined output current, the controller causing the switching power converter to enter a stand-by mode responsive to the load detection circuit determining a no-load condition in which the output load is less than a predetermined output load, wherein the controller lowers a reference voltage corresponding to a target output voltage of the switching power converter in the stand-by mode responsive to the load detection circuit determining the no-load condition, and wherein the load detection circuit determines the output current based on a transformer reset time, a switching period, and the secondary current.

7. A switching power converter, comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a controller configured to generate a control signal to turn on or turn off the switch, the switch being turned on responsive to the control signal being in a first state and the switch being turned off responsive to the control signal being in a second state; and
a load detection circuit configured to determine an output load of the switching power converter and to determine whether an output current of the switching power converter is less than a predetermined output current, the controller causing the switching power converter to enter a stand-by mode responsive to the load detection circuit determining a no-load condition in which the output load is less than a predetermined output load, wherein the controller lowers a reference voltage corresponding to a target output voltage of the switching power converter in the stand-by mode responsive to the load detection circuit determining the no-load condition, and wherein the load detection circuit further determines whether a difference in a switching period over at least two switching cycles is less than a predetermined difference in switching period.

8. A switching power converter, comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a controller configured to generate a control signal to turn on or turn off the switch, the switch being turned on responsive to the control signal being in a first state and the switch being turned off responsive to the control signal being in a second state; and
a load detection circuit configured to determine an output load of the switching power converter and to determine whether an output current of the switching power converter is less than a predetermined output current, the controller causing the switching power converter to enter a stand-by mode responsive to the load detection circuit determining a no-load condition in which the output load is less than a predetermined output load, wherein the controller lowers a reference voltage corresponding to a target output voltage of the switching power converter in the stand-by mode responsive to the load detection circuit determining the no-load condition, and wherein the load detection circuit further determines whether a difference in a transformer reset time over at least two switching cycles is less than a predetermined difference in transformer reset time.

9. A switching power converter, comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off;
a controller configured to generate a control signal to turn on or turn off the switch, the switch being turned on responsive to the control signal being in a first state and the switch being turned off responsive to the control signal being in a second state; and
a load detection circuit configured to determine an output load of the switching power converter and to determine whether an output current of the switching power converter is less than a predetermined output current, the controller causing the switching power converter to enter a stand-by mode responsive to the load detection circuit determining a no-load condition in which the output load is less than a predetermined output load, wherein the controller lowers a reference voltage corresponding to a target output voltage of the switching power converter in the stand-by mode responsive to the load detection circuit determining the no-load condition, and wherein the load detection circuit further determines whether a difference in the current through the primary winding over at least two switching cycles is less than a predetermined difference in primary current.

10. A method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
determining an output current of the switching power converter as an average of secondary current in the secondary winding of the transformer;
determining an output load of the switching power converter;
determining whether the output current is less than a predetermined output current;
entering a stand-by mode of the switching power converter, responsive to determining a no-load condition in which the output load is less than a predetermined output load; and
lowering, by a controller for controlling the switching power converter, a reference voltage corresponding to a target output voltage of the switching power converter in the stand-by mode, responsive to determining the no-load condition.

11. The method of claim 10, further comprising shutting down operation of the switching power converter for a predetermined period of time in the stand-by mode, responsive to determining the no-load condition.

12. The method of claim 10, wherein determining the output load comprises integrating a difference between a sampled voltage indicative of an actual output voltage and a target output voltage of the switching power converter over a predetermined duration to determine an impedance of the output load.

13. The method of claim 10, further comprising determining whether an electronic device is connected to the output of the switching power converter.

14. The method of claim 13, further comprising determining whether a battery of the electronic device is fully charged.

15. A method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
- determining an output load of the switching power converter;
- determining whether an output current of the switching power converter is less than a predetermined output current;
- entering a stand-by mode of the switching power converter, responsive to determining a no-load condition in which the output load is less than a predetermined output load; and
- lowering, by a controller for controlling the switching power converter, a reference voltage corresponding to a target output voltage of the switching power converter in the stand-by mode, responsive to determining the no-load condition,
- wherein the output current is determined based on a transformer reset time, a switching period, and the secondary current.

16. A method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
- determining an output load of the switching power converter;
- determining whether an output current of the switching power converter is less than a predetermined output current;
- determining whether a difference in switching period over at least two switching cycles is less than a predetermined difference in switching period;
- entering a stand-by mode of the switching power converter, responsive to determining a no-load condition in which the output load is less than a predetermined output load; and
- lowering, by a controller for controlling the switching power converter, a reference voltage corresponding to a target output voltage of the switching power converter in the stand-by mode, responsive to determining the no-load condition.

17. A method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
- determining an output load of the switching power converter;
- determining whether an output current of the switching power converter is less than a predetermined output current;
- determining whether a difference in transformer reset time over at least two switching cycles is less than a predetermined difference in transformer reset time;
- entering a stand-by mode of the switching power converter, responsive to determining a no-load condition in which the output load is less than a predetermined output load; and
- lowering, by a controller for controlling the switching power converter, a reference voltage corresponding to a target output voltage of the switching power converter in the stand-by mode, responsive to determining the no-load condition.

18. A method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
- determining an output load of the switching power converter;
- determining whether an output current of the switching power converter is less than a predetermined output current; and
- determining whether a difference in the current through the primary winding over at least two switching cycles is less than a predetermined difference in the primary current;
- entering a stand-by mode of the switching power converter, responsive to determining a no-load condition in which the output load is less than a predetermined output load; and
- lowering, by a controller for controlling the switching power converter, a reference voltage corresponding to a target output voltage of the switching power converter in the stand-by mode, responsive to determining the no-load condition.

* * * * *